US006763521B2

(12) United States Patent
Thayne (10) Patent No.: US 6,763,521 B2
(45) Date of Patent: Jul. 13, 2004

(54) LOW COST STORAGE DEVICE AND METHOD OF USING THE SAME

(75) Inventor: Mark S. Thayne, West Point, UT (US)

(73) Assignee: Iomega Corporation, San Diego, CA (US)

( * ) Notice: Subject to any disclaimer, the term of this patent is extended or adjusted under 35 U.S.C. 154(b) by 328 days.

(21) Appl. No.: 09/760,176

(22) Filed: Jan. 15, 2001

(65) Prior Publication Data

US 2002/0093907 A1 Jul. 18, 2002

(51) Int. Cl.[7] .................................................. G11B 3/70

(52) U.S. Cl. ....................................................... 720/719

(58) Field of Search ................................ 369/289, 291; 360/133, 99.06, 137; 206/308.1, 308.3; 414/331.05

(56) References Cited

U.S. PATENT DOCUMENTS

| 4,385,335 | A | * | 5/1983 | Kiemer ........................ 360/137 |
| 4,471,397 | A | * | 9/1984 | Cloutier ....................... 360/133 |
| 4,844,679 | A | * | 7/1989 | Teranishi ................ 414/331.05 |
| 5,475,674 | A | * | 12/1995 | Yamashita et al. ........... 369/291 |
| 5,638,228 | A |   | 6/1997 | Thomas, III .................. 360/60 |
| 5,677,818 | A |   | 10/1997 | Ma et al. ..................... 360/133 |
| 5,903,542 | A | * | 5/1999 | Sandell et al. .............. 369/291 |
| 6,002,557 | A | * | 12/1999 | Tanaka ........................ 360/133 |
| 6,172,846 | B1 | * | 1/2001 | Ariyoshi ................... 360/99.06 |
| 6,282,060 | B1 | * | 8/2001 | Thomas, III ................. 360/133 |
| 6,345,035 | B1 | * | 2/2002 | Aoki et al. .................. 369/291 |

* cited by examiner

Primary Examiner—Tianjie Chen
(74) Attorney, Agent, or Firm—James T. Hagler (57) ABSTRACT

A disk cartridge assembly that allows a storage medium to be inserted and removed from a reusable disk cartridge for use in a disk drive. The assembly has an insert that contains a storage medium and a reusable disk cartridge that can be opened and closed for insertion and removal of the insert.

40 Claims, 7 Drawing Sheets

LOW COST STORAGE DEVICE AND METHOD OF USING THE SAME

FIELD OF THE INVENTION

This invention relates to disk cartridges for storing electronic information, and more particularly, to a low cost storage device and to a method of making the same.

BACKGROUND

Removable disk cartridges for storing digital electronic information typically comprise an outer casing or shell that houses a magnetic, magneto-optical or optical disk upon which electronic information can be stored. The cartridge shell often comprises upper and lower halves that are joined together to house the disk. The disk is mounted on a hub that rotates freely within the cartridge. When the cartridge is inserted into a disk drive, a spindle motor in the drive engages with the disk hub in order to rotate the disk within the cartridge at a given speed. The outer shell of the cartridge typically has an aperture near one edge to provide the recording heads of the drive with access to the disk. A shutter or door mechanism is often provided to cover the aperture when the cartridge is not in use to prevent dust or other contaminants from entering the cartridge and settling on the recording surface of the disk.

Generally, the outer casing or shell that houses the disk is an expensive manufacturing component of the disk cartridge. Accordingly, it would be commercially advantageous to both the user and the manufacturer if one could buy and sell the shell and the storage medium contained therein separately. By buying separately, the overall cost to the consumer would be reduced because the user may reuse the expensive shell with different less expensive media. By selling separately, the manufacturer could decrease manufacturing cost and improve the overall profit margin.

For the foregoing reasons, there is a need for a disk cartridge assembly in which consumers can separately purchase the shell and the storage media. The present invention satisfies this need.

SUMMARY

The present invention is directed to an apparatus that satisfies the financial and technical needs of computer users by providing a disk cartridge assembly having a low cost storage medium insert and a reusable cartridge. A disk cartridge assembly having the features of the present invention comprises an outer shell and an insert. The insert has a sleeve and a rotatable storage medium inside the sleeve. The outer shell has an upper portion and a lower portion that can be opened and closed to allow insertion and removal of the insert. The outer shell is adapted for insertion into a disk drive unit.

The advantages of the invention combined with other attributes thereof will become more apparent upon consideration of the ensuing specification, particularly when considered in light of the attached drawings, directed towards particular embodiments of the invention but also illustrative of the underlying concepts thereof.

BRIEF DESCRIPTION OF THE DRAWINGS

The foregoing summary, as well as the following detailed description of the preferred embodiments, is better understood when read in conjunction with the attached drawings. For the purpose of illustrating the invention, there is shown in the drawings embodiments that are presently preferred, it being understood, however, that the invention is not limited to the specific apparatus, system, and instrumentalities disclosed. In the drawings.

DETAILED DESCRIPTION

Figure 1:
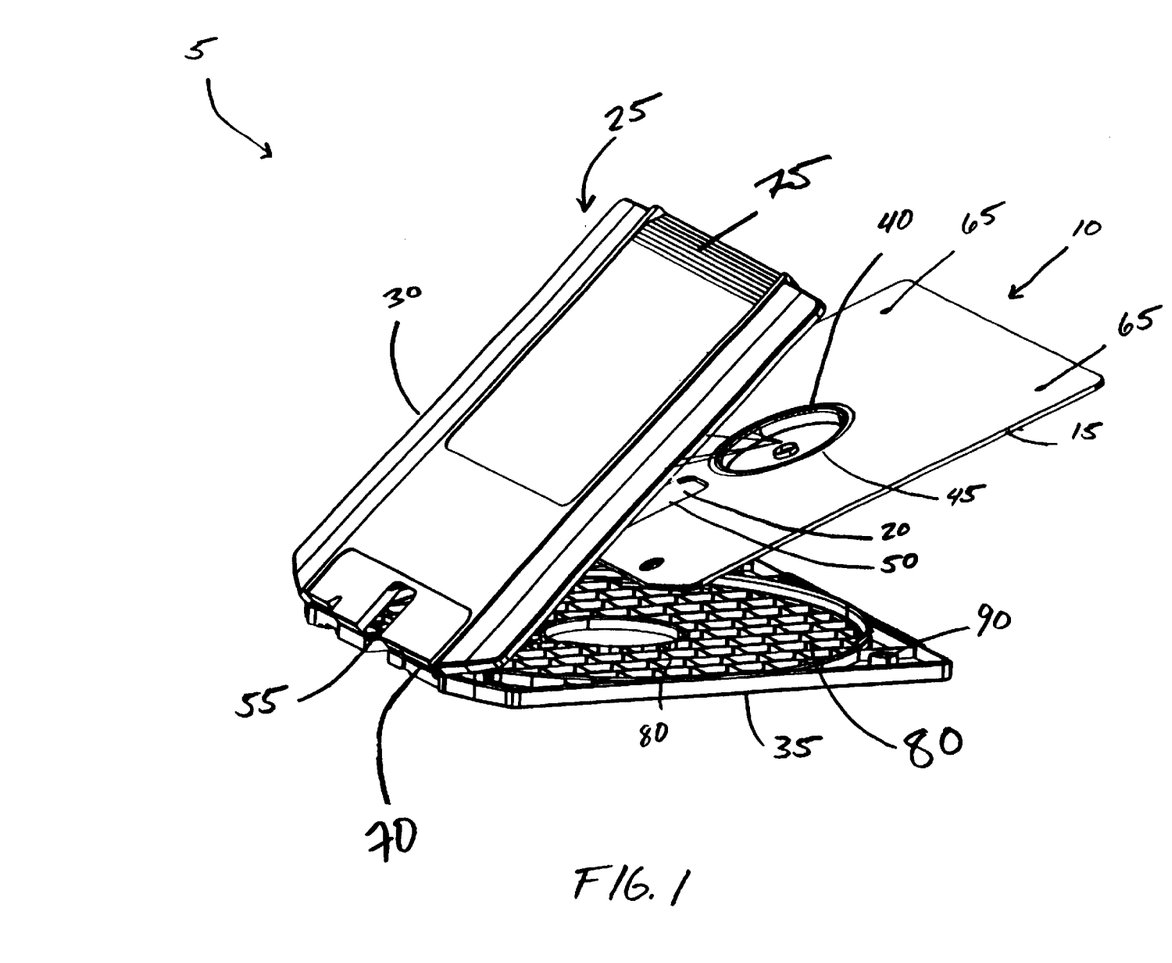
FIG. 1 is a perspective view of the disk cartridge assembly with the sleeve partially inserted into the reusable cartridge, according to an embodiment of the present invention.

Referring to the drawings wherein like numerals represent like elements throughout, there is shown in FIG. 1 a disk cartridge assembly 5 comprising an insert 10 and an outer shell 25. The insert 10 has a sleeve 15 and a rotatable storage medium 20 within the sleeve 15. The outer shell 25 has an upper portion 30 and a lower portion 35. Preferably, as shown, a hinge 70 connects the upper portion 30 and lower portion 35 to enable the outer shell 25 to be easily opened and closed for the insertion and removal of the insert 10.

In the present embodiment, the hinge comprises a thin, durable rib of suitable material that is integrally molded into the upper portion 30 and lower portion 35. In other embodiments, however, any suitable mechanism can be used such as, for example, snap molds, third piece hinges and the like, without departing from the spirit and scope of the present invention. In another embodiment, (not shown) the upper portion 30 and lower portion 35 may not be connected by a hinge but instead may be capable of being completely separated from one another to permit insertion of the insert 10.

In the present embodiment, the outer shell 25 has a form factor of the ZIP® family of computer storage media and is adapted for insertion into a ZIP® drive, such as that manufactured by Iomega Inc., Roy, Utah. In other embodiments, the outer shell may have other form factors adapted for other storage devices such as, for example a conventional 3.5 inch disk drive without departing from the principles of the present invention.

Preferably, as shown, the storage medium 20 has a hub 40 for purposes of rotating the storage medium and the sleeve 15 has an opening 45 that exposes the hub 40. The storage medium 20 is not connected to sleeve 15 but instead moves freely or "floats" in the sleeve 15. This configuration allows the spindle of a conventional disk drive unit (not shown) to spin the storage medium for read/write purposes.

The outer shell 25 is made of acryonitrile-butadiene-styrene (ABS), a common plastic used in the manufacturing of disk cartridges. Other suitable materials can be used, such as, for example, polystyrene, polycarbonate, and other plastic blends as well as possibly metal and other suitable materials without departing from the principles of the present invention.

Further in accordance with the present embodiment, the outer shell 25 further comprises a waffle portion 80 on the inside of both the upper and lower portions of the outer shell 25. The waffle portion 80 adds structural integrity to the assembly as well as reduces the manufacturing cost by cutting out excess materials.

The storage medium 20 may comprise any form of medium for the storage of data, including for example, flexible (e.g. "floppy") or rigid (e.g. "hard") magnetic media, optical media, magneto-optical media or the like. In one preferred embodiment, the storage medium comprises a flexible (e.g. "floppy") magnetic storage medium. The storage medium 20 may be rewritable or write once, read many (WORM), as desired.

The sleeve 15 has an opening 50 wherein the opening 50 exposes a portion of the storage medium 20 and the outer shell 25 also has an opening 55 that is aligned with the opening 50 in the sleeve 15. This configuration gives the read/write head of a disk drive unit access to the storage medium 20. In the present embodiment, as shown, the outer shell 25 has a ribbed portion 75 that allows the holder of the disk cartridge assembly to more easily grip the assembly.

The sleeve is made of plastic, preferably polyvinyl chloride (PVC). The sleeve, however, could also be made of any suitable material, such as, for example ABS, polycarbonate, High Impact Polystyrene (HIPS) or the like without departing from the principles of the present invention.

Figure 4:
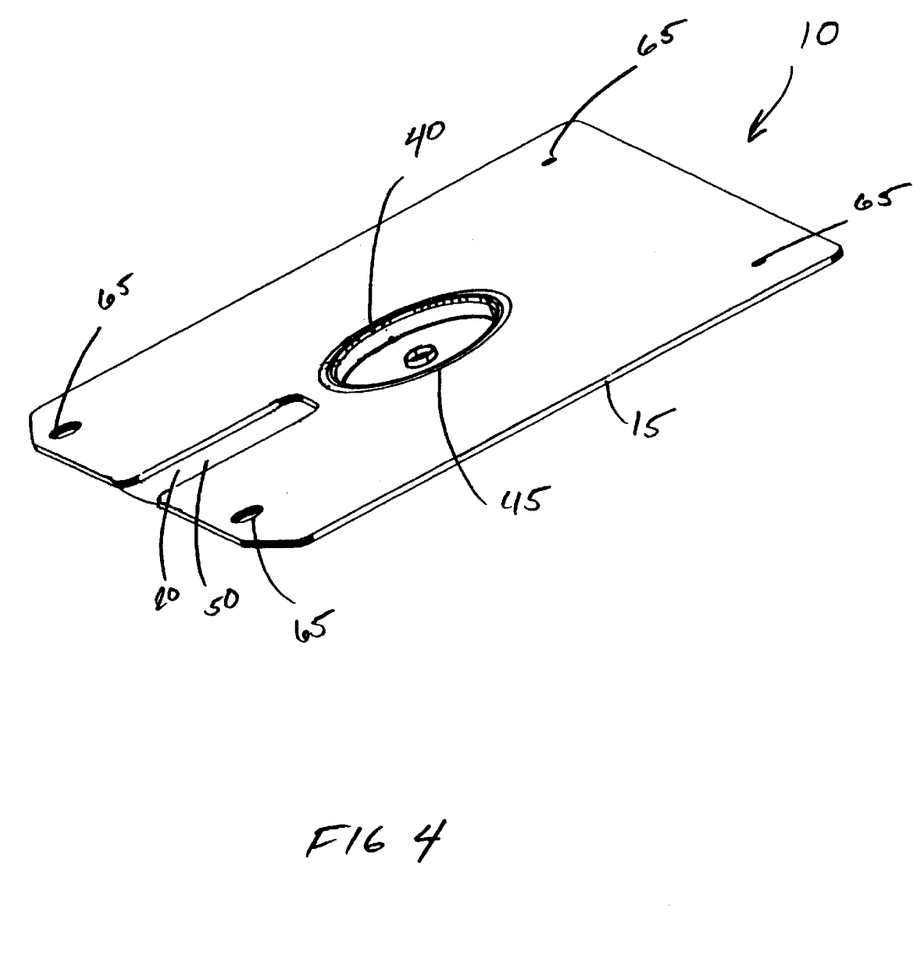
FIG. 4 is a perspective view of the sleeve of FIG. 1, in accordance with an embodiment of the present invention.
Figure 5:
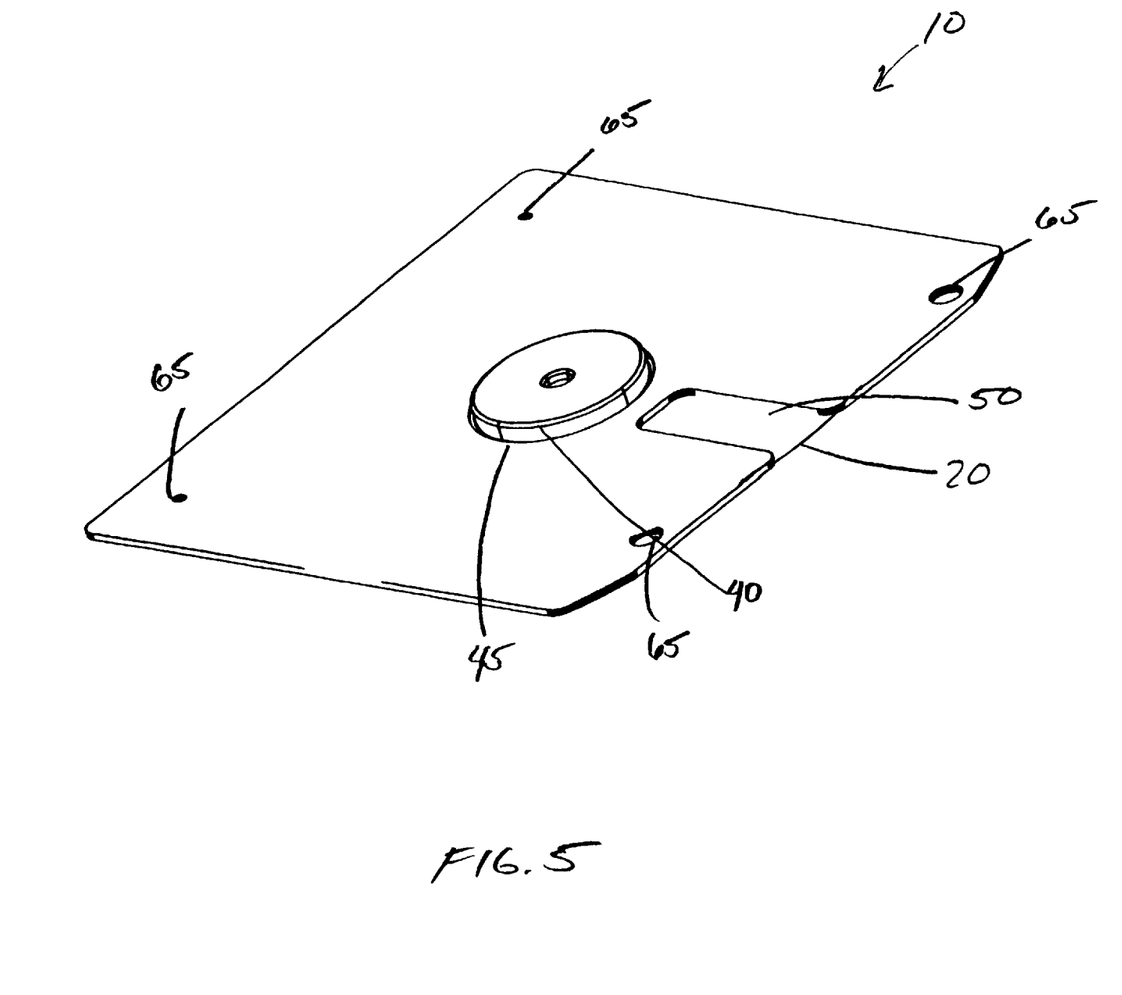
FIG. 5 is another perspective view of the sleeve of FIG. 4.

FIG. 4 and FIG. 5 show perspective views of the sleeve 15 without the outer shell 25. FIG. 4 and FIG. 5 show more clearly the sleeve 15 that contains the storage medium 20.

Figure 6:
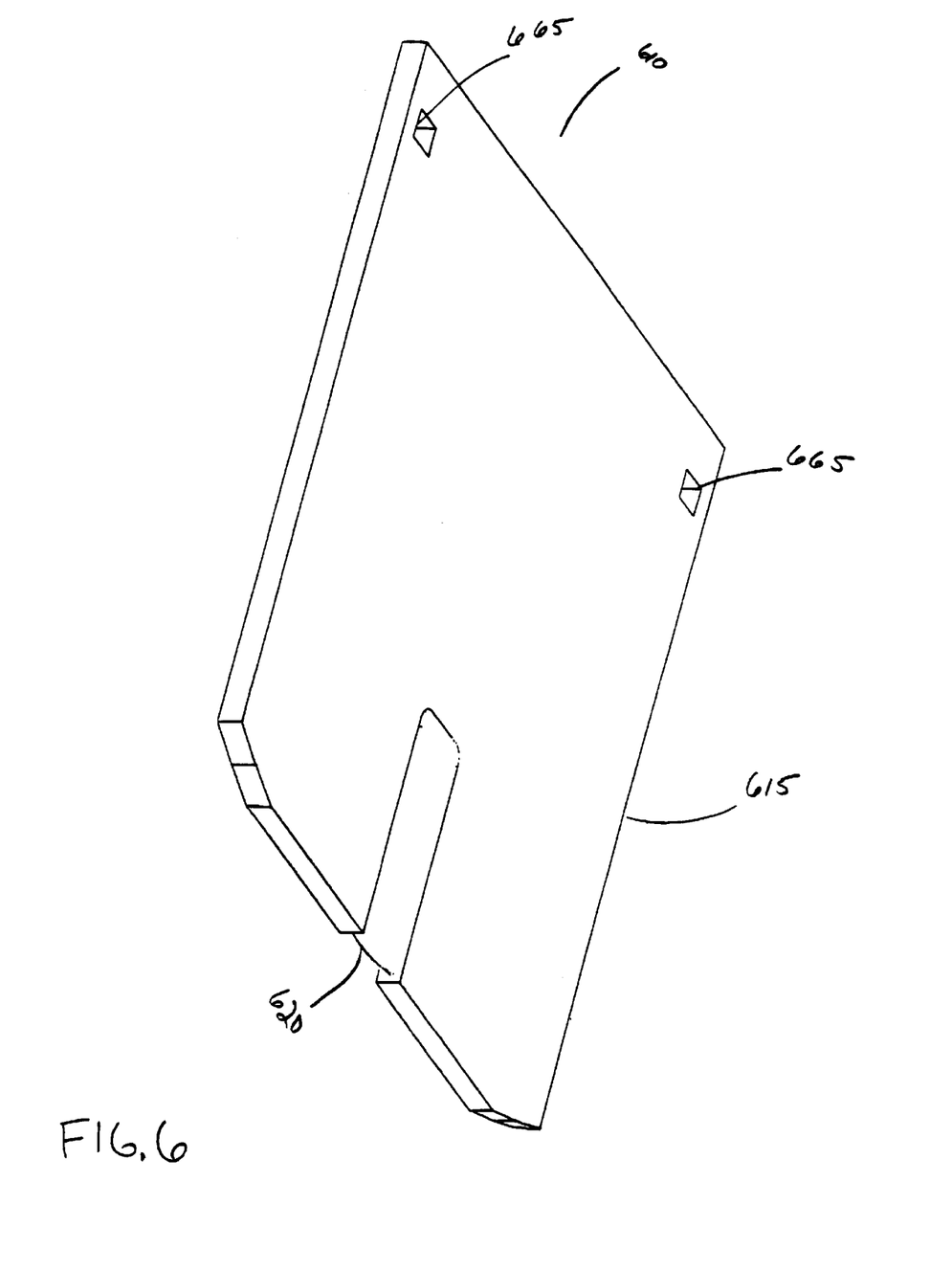
FIG. 6 is a perspective view of a sleeve according to another embodiment of the present invention.

FIG. 6 is a perspective view of a sleeve according to another embodiment of the present invention. In this particular embodiment, the insert 610 has a sleeve 615 and a rotatable storage medium 620 within the sleeve 615. The sleeve 615 is shaped as a conventional 3.5 inch diskette cartridge and can be used as the insert to another outer shell having a standard 3.5 inch floppy diskette form factor. The sleeve 615 also has alignment holes 665 that will be discussed fully below.

Figure 7:
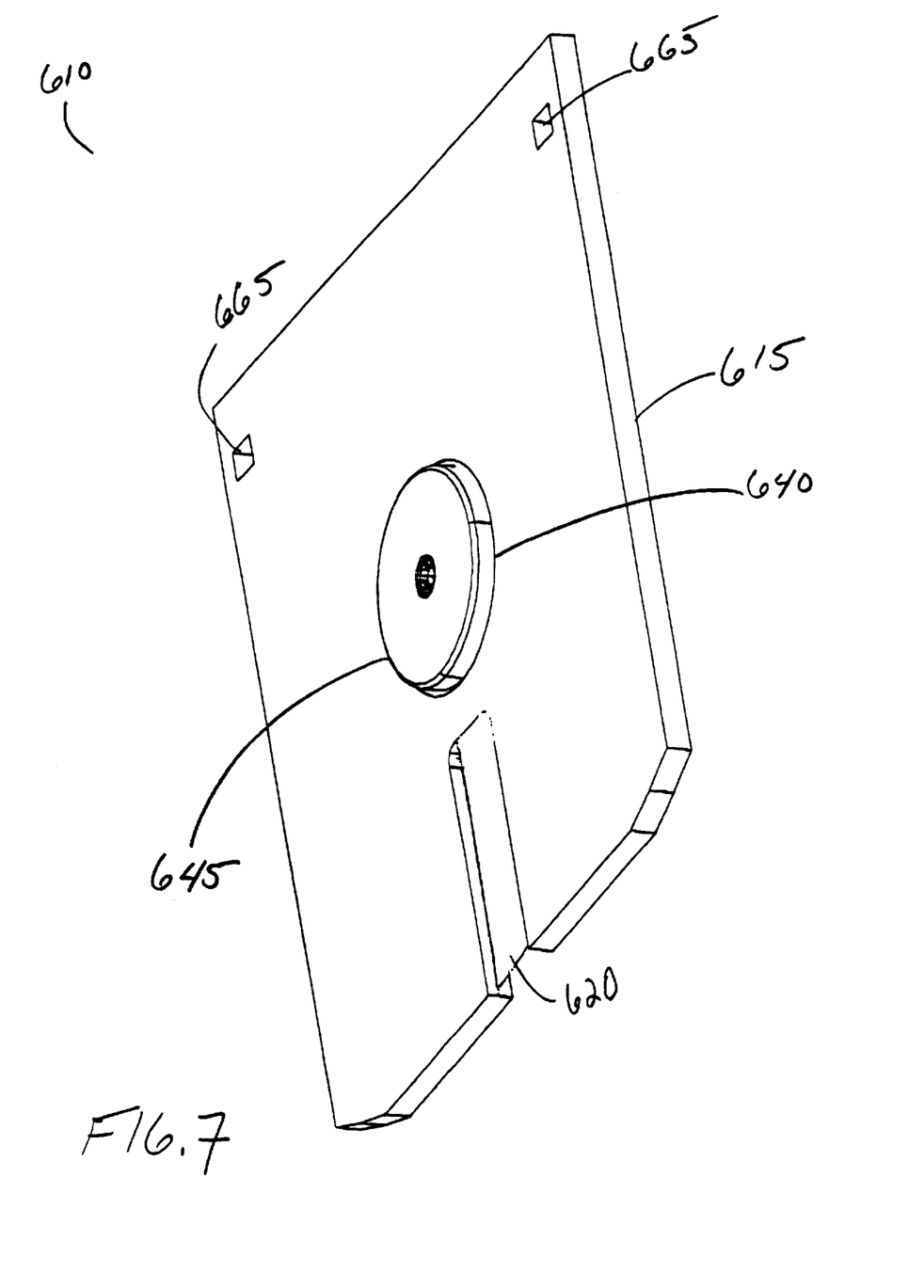
FIG. 7 is yet another perspective view of the sleeve of FIG. 6.

FIG. 7 is yet another perspective view of the sleeve of FIG. 6. FIG. 7 shows an opening 645 that exposes hub 640 which is used for purposes of rotating the storage medium 620. As stated earlier, the storage medium 620 is not connected to sleeve 615 but instead moves freely or "floats" in the sleeve 615.

Referring back to FIG. 2, according to the preferred embodiment of the present invention, the outer shell 25 has fastening means that serve a dual purpose. First, the fastening means keeps the outer shell 25 closed and prevents the insert 10 from falling out of the shell 25. Preferably, as shown, the fastening means comprises at least one fastening pin 60 on one of the upper or lower portions 30,35 of the shell 30 and a mating cavity 90 on the other portion 30,35. The fastening pin 60 and mating cavity 90 mate to form an interference fit when the outer shell 25 is closed, thus fastening the lower portion 35 and the upper portion 30 together. In the embodiment shown, the fastening pin 60 is on the upper portion 30 and the mating cavity 90 on the lower portion 35, but this could be reversed. Also, in other embodiments, other fastening configurations can be used, such as, for example, screws, latches, interlocks and the like, without departing from the spirit and scope of the present invention.

Figure 2:
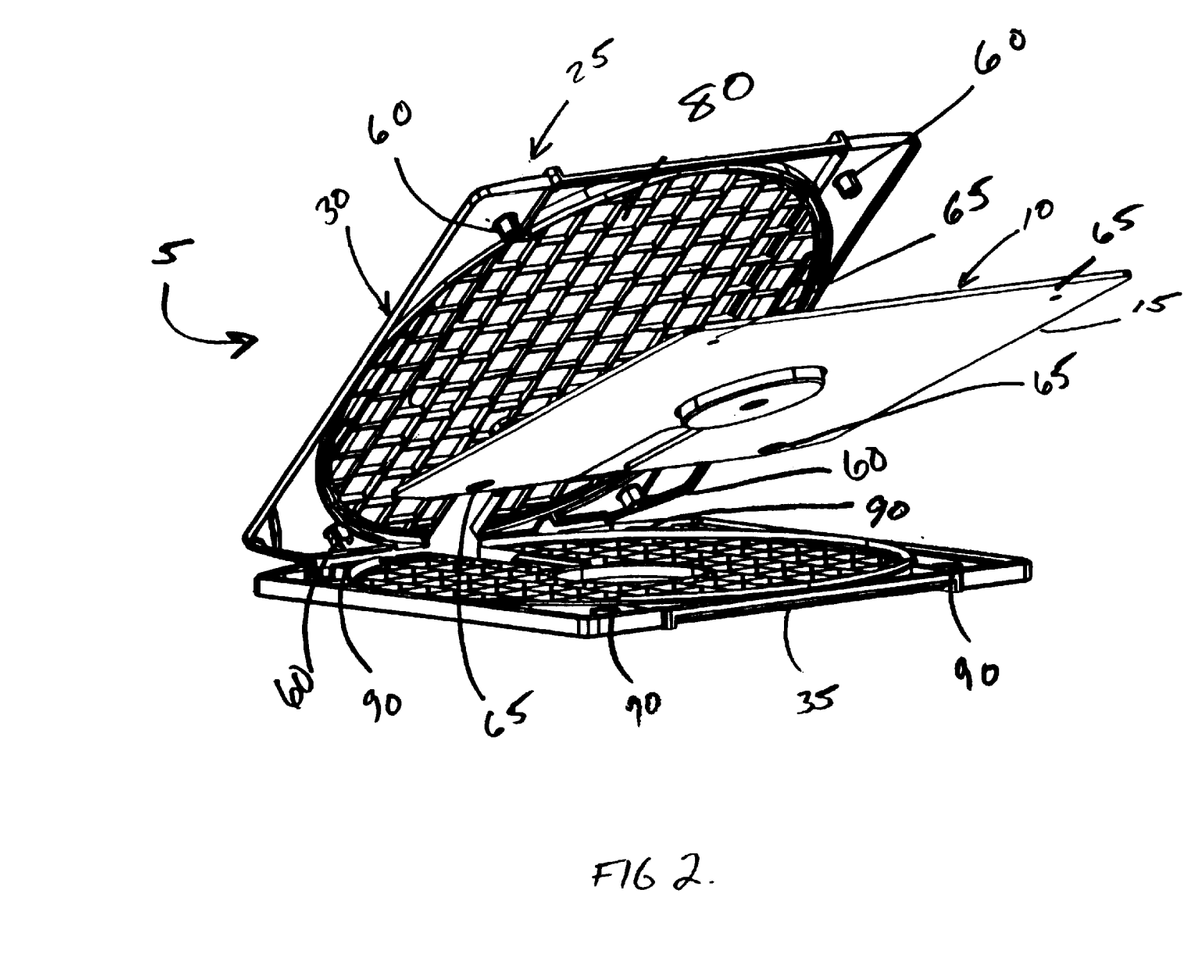
FIG. 2 is another perspective view of the disk cartridge assembly of FIG. 1.

The fastening means also preferably serves to align the insert 10 while in the outer shell 25. In the preferred embodiment, when the shell 30 closed, the fastening pins 60 on the outer shell 25 extend through corresponding alignment holes 65 in the sleeve 15. In other embodiments, the pins 60 may be on the sleeve and the holes 65 on the outer shell 25. In either case, the fastening pins 60 and the alignment holes 65 mate to align and secure the insert 10 inside the outer shell 25 when the outer shell 25 is closed. Preferably, the fastening pins 60 and the alignment cavities 65 are located proximate the corners of outer shell 25 and sleeve 15. In other embodiments, other layouts can be used without departing from the spirit and scope of the present invention.

Figure 3:
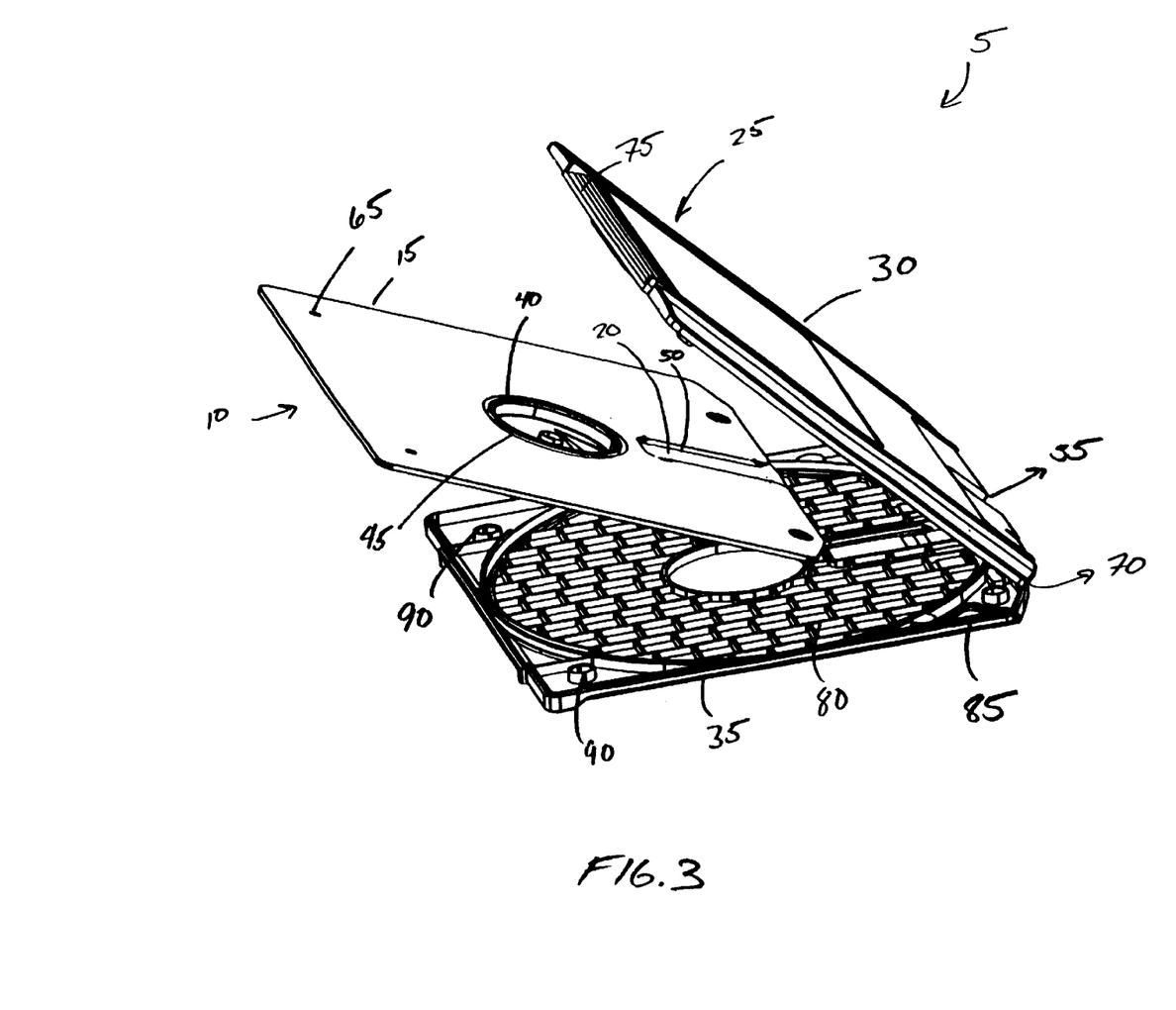
FIG. 3 is yet another perspective view of the disk cartridge assembly of FIG. 1.

Referring now to FIG. 3, the cartridge outer shell 25 may further comprise a reflective marker 85. The reflective marker may, for example, be a retroreflective marker such as that described in commonly assigned U.S. Pat. No. 5,638,228, entitled "Retroreflective Marker for Data Storage Cartridge". The reflective marker 85 is detected by a disk drive enable circuit (not shown) to enable the disk drive to operate. In this way, the drive cannot be used with improper cartridges that might damage it. Also, the reflective marker 85 can be used for write protection of the cartridge.

In use, a user opens the outer shell 25 and removes a currently inserted insert 10. The user then inserts a new insert 10 into the outer shell. Depending on the embodiment of the disk cartridge assembly 5, when inserting, the user must align the insert 10 to properly fit in the outer shell 25. The user then closes the outer shell 25 securing the insert in the outer shell 25. Then, the user may insert the disk cartridge assembly 5 into any suitable device that has a drive mechanism adapted to receive removable storage media.

As the foregoing illustrates, the present invention is directed to a disk cartridge assembly and method of using the same. It is understood that changes may be made to the embodiments described above without departing from the broad inventive concepts thereof. For example the outer shell could be configured not only to fit in a Zip® drive but also in a conventional 3.5 inch disk drive of a personal computer, digital camera, personal data assistant or other device. Accordingly, the present invention is not limited to the particular embodiments disclosed, but is intended to cover all modifications that are within the spirit and scope of the invention, as defined by the appended claims.

What is claimed is:

1. A disk cartridge assembly comprising:
   an insert comprising:
      a sleeve; and
      a rotatable storage medium within said sleeve; and
   an outer shell comprising:
      an upper portion; and
      a lower portion that together can be opened and closed to enable insertion and removal of said insert, and which outer shell is adapted for insertion into a disk drive unit wherein one of said sleeve end said outer shell has a fastening pin and the other of said outer shell and said sleeve has an alignment hole, wherein said fastening pin and said alignment hole mate to align said insert inside said outer shell wherein said outer shell is closed and further wherein said fastening pin and alignment hole are located proximate a corner of said outer shell and said sleeve.

2. The disk cartridge assembly recited in claim 1, wherein said storage medium further comprises a hub for purposes of rotating said storage medium, and wherein said sleeve has an opening that exposes said hub.

3. The disk cartridge assembly recited in claim 1, wherein said sleeve has an opening that exposes a portion of said storage medium.

4. The disk cartridge assembly recited in claim 3, wherein said outer shell further has an opening that is aligned with said opening in said sleeve for access to the storage medium.

5. The disk cartridge assembly recited in claim 1, wherein said assembly further comprises a hinge that connects said upper portion and said lower portion.

6. The disk cartridge assembly recited in claim 5, wherein said hinge comprises a thin rib integrally formed with said upper and lower portion of said shell.

7. The disk cartridge assembly recited in claim 1, wherein said outer shell has a section of ribs wherein a user can more easily grip said shell.

8. The disk cartridge assembly recited in claim 1, wherein at least one of the upper and lower portions has a waffle portion that provides structural strength.

9. The disk cartridge assembly recited in claim 8, wherein both said lower portion and said upper portion has a waffle portion.

10. The disk cartridge assembly recited in claim 1, wherein said outer shell further comprises a reflective marker.

11. The disk cartridge assembly recited in claim 10, wherein said reflective marker is a retroreflective marker.

12. The disk cartridge assembly recited in claim 10, wherein said reflective marker is located proximate a corner of said outer shell.

13. The disk cartridge assembly recited in claim 1, wherein one of said lower portion and said upper portion of said outer shell has a fastening pin and the other of said lower portion and upper portion has a mating cavity wherein said fastening pin and said cavity mate to fasten said lower portion and said upper portion.

14. The disk cartridge assembly recited in claim 13, wherein said fastening pin and mating cavity are located proximate a corner of said upper portion and said lower portion.

15. A disk cartridge assembly comprising:
an insert comprising:
a sleeve; arid
a rotatable storage medium within said sleeve; and
an outer shell comprising:
an upper portion; and
a lower portion that together can be opened and closed to enable insertion and removal of said insert, and which outer shell is adapted for insertion into a disk drive unit wherein one of said sleeve and said outer shell comprises a plurality of fastening pins and the other of said sleeve and said outer shell comprises a plurality of alignment holes wherein said plurality of fastening pins and said plurality of alignment holes mate to align said insert inside said outer shell when said outer shell is closed.

16. The disk cartridge assembly recited in claim 15, wherein said storage medium further comprises a hub for purposes of rotating said storage medium, and wherein said sleeve has an opening that exposes said hub.

17. The disk cartridge assembly recited in claim 15, wherein said sleeve has an opening that exposes a portion of said storage medium.

18. The disk cartridge assembly recited in claim 17, wherein said outer shell further has an opening that is aligned with said opening in said sleeve for access to the storage medium.

19. The disk cartridge assembly recited in claim 15, wherein at least one of said fastening pin and alignment hole are located proximate a corner of said outer shell and said sleeve.

20. The disk cartridge assembly recited in claim 15, wherein said assembly further comprises a hinge that connects said upper portion and said lower portion.

21. The disk cartridge assembly recited in claim 20, wherein said hinge comprises a thin rib integrally formed with said upper and lower portion of said shell.

22. The disk cartridge assembly recited in claim 15, wherein said outer shell has a section of ribs wherein a user can more easily grip said shell.

23. The disk cartridge assembly recited in claim 15, wherein at least one of the upper and lower portions has a waffle portion that provides structural strength.

24. The disk cartridge assembly recited in claim 15, wherein both said lower portion and said upper portion has a waffle portion.

25. The disk cartridge assembly recited in claim 15, wherein said outer shell further comprises a reflective marker.

26. The disk cartridge assembly recited in claim 25, wherein said reflective marker is a retroreflective marker.

27. The disk cartridge assembly recited in claim 25, wherein said reflective marker is located proximate a corner of said outer shell.

28. The disk cartridge assembly recited in claim 15, wherein one of said lower portion and said upper portion of said outer shell has said fastening pin and the other of said lower portion and upper portion has a mating cavity wherein said fastening pin and said cavity mate to fasten said lower portion and said upper portion.

29. The disk cartridge assembly recited in claim 28, wherein said fastening pin and mating cavity are located proximate a corner of said upper portion and said lower portion.

30. A disk cartridge assembly comprising:
an insert comprising:
a sleeve; and
a rotatable storage medium within said sleeve; and
on outer shell comprising:
an upper portion; and
a lower portion that together can be opened and closed to enable insertion and removal of said insert, and which outer shell is adapted far insertion into a disk drive unit wherein one of said lower portion and said upper portion of said outer shell has a fastening pin and the other of said lower portion and upper portion has a mating cavity wherein said fastening pin and said cavity mate to fasten said lower portion and said upper portion, wherein the mating of the fastening pin and said cavity positions an opening in the sleeve that exposes a portion of said storage medium with an opening in said outer shell, and further wherein one of said sleeve and said outer shell comprises a plurality of fastening pins and the other of said sleeve and said outer shall comprises a plurality mating cavities.

31. The disk cartridge assembly recited in claim 30, wherein cold storage medium further comprises a hub for purposes of rotating said storage medium, and wherein said sleeve has an opening that exposes said hub.

32. The disk cartridge assembly recited in claim 30, wherein said assembly further comprises a hinge that connects said upper portion and said lower portion.

33. The disk cartridge assembly recited in claim 32, wherein said hinge comprises a thin rib integrally formed with said upper and lower portion of said shell.

34. The disk cartridge assembly recited in claim 30, wherein said outer shell has a section of ribs wherein a user can more easily grip said shell.

35. The disk cartridge assembly recited in claim 30, wherein at least one of the upper and lower portions has a waffle portion that provides structural strength.

36. The disk cartridge assembly recited in claim 30, wherein both said lower portion and said upper portion has a waffle portion.

37. The disk cartridge assembly recited in claim 30, wherein said outer shell further comprises a reflective marker.

38. The disk cartridge assembly recited in claim 37, wherein said reflective marker is a retroreflective marker.

39. The disk cartridge assembly recited in claim 37, wherein said reflective marker is located proximate a corner of said outer shell.

40. The disk cartridge assembly recited in claim 30, wherein said fastening pin and mating cavity are located proximate a corner of said upper portion and said lower portion.

* * * * *